United States Patent
Basso et al.

(10) Patent No.: US 7,286,526 B2
(45) Date of Patent: Oct. 23, 2007

(54) UNIFORM MANAGEMENT OF MIXED NETWORK SYSTEMS

(75) Inventors: Claude Basso, Raleigh, NC (US); Sridhar Rao, Raleigh, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 10/389,472

(22) Filed: Mar. 14, 2003

(65) Prior Publication Data

US 2004/0179519 A1    Sep. 16, 2004

(51) Int. Cl.
*H04L 12/50*    (2006.01)
(52) U.S. Cl. ............... 370/360; 370/367; 709/232; 718/104
(58) Field of Classification Search ............... None
See application file for complete search history.

(56) References Cited

U.S. PATENT DOCUMENTS

| | | | |
|---|---|---|---|
| 5,377,182 A | 12/1994 | Monacos | |
| 5,379,295 A | 1/1995 | Yonehara | |
| 5,440,553 A | 8/1995 | Widjaja et al. | |
| 5,442,791 A * | 8/1995 | Wrabetz et al. | 719/330 |
| 5,634,015 A * | 5/1997 | Chang et al. | 710/310 |
| 5,930,259 A | 7/1999 | Katsube et al. | |
| 6,034,963 A | 3/2000 | Minami et al. | |
| 6,105,031 A | 8/2000 | Commerford, Jr. et al. | |
| 6,172,980 B1 | 1/2001 | Flanders et al. | |
| 6,269,082 B1 | 7/2001 | Mawhinney et al. | |
| 6,278,709 B1 | 8/2001 | Walker et al. | |
| 6,279,035 B1 | 8/2001 | Brown et al. | |
| 6,701,377 B2 * | 3/2004 | Burmann et al. | 709/249 |
| 2003/0069828 A1 * | 4/2003 | Blazey et al. | 705/37 |
| 2004/0025159 A1 * | 2/2004 | Scheuermann et al. | 718/100 |

* cited by examiner

*Primary Examiner*—Duc Ho
(74) *Attorney, Agent, or Firm*—Sawyer Law Group LLP

(57) ABSTRACT

A method and system for providing network processor management that efficiently operates in homogenous and heterogonous environments are provided. The system includes a controlled entity having a switched architecture including a first set of processing resources and a second set of processing resources distinct from the first set of processing resources, and a controller for issuing a control request packet to the first set of processing resources, the control request packet including a first set of control actions and a second set of control actions, wherein the controlled entity processes the first set of control actions using the first set of processing resources and transfers the second set of control actions to the second set of processing resources.

15 Claims, 4 Drawing Sheets

| Length<br>(16 bits) | Completion<br>(8 bits) | Mode<br>(2 bits) | Command<br>(6 bits) |

UNIFORM MANAGEMENT OF MIXED NETWORK SYSTEMS

FIELD OF THE INVENTION

The present invention relates generally to network processor architectures and more specifically to uniform management of mixed systems of network processors from a control point.

BACKGROUND OF THE INVENTION

It is known to provide switched network processor architectures in which both ingress and egress data structures are accessible and manageable by control plane software executing on a single side (typically the egress side) of a network processor. This is possible due to a lack of a hard boundary between the data structures on the two sides of the processor. The IBM PowerNP NP4GS3 is an example of such a network processor.

FIG. 1 is a schematic representation of a network processor 100 (e.g., the NP4GS3) having a switched architecture in which processing resources are shared between egress and ingress sides. Network processor 100 includes an ingress side 105 and an egress side 110, each having a set of communication ports 115 (e.g., data movers or DM), a set of processing resources 120 (e.g., core language processors or CLP) and a control 125 (e.g., guided frame handler or GFH). Additionally, it is common to provide additional functionality on one side that is not duplicated on the other side. For example, the NP4GS3 includes a general table handler (GTH) 130 for handling tree management commands.

Network processor 100 provides for a logical boundary between egress side 110 and ingress side 105 with all data structures residing on the same physical memories. The logical grouping of data structures may be structured in several different ways but in the NP4GS3, the logical grouping of data structures into an ingress category or an egress category is based upon when the data structures are accessed in a forwarding path.

One advantage to grouping the data structures by logical boundaries instead of physical boundaries is that a control point is able to create/initialize all data structures (e.g., both egress and ingress categories) by directing control plane messages, carrying appropriate management commands, to a single side of the network processor for processing. In the NP4GS3, this single side is typically the egress side because the egress side is constructed in such a way that there is greater resource availability on the egress side.

However, there are some network processors that have switched architectures in which the ingress/egress split occurs on physical boundaries and not logical boundaries. FIG. 2 is a schematic representation of a network processor 200 having a switched architecture in which processing resources are split between an ingress side 205 and an egress side 210. Network processor 200 has a hard boundary between egress and ingress data structures inhibiting egress software from directly accessing ingress data structures (as well as inhibiting ingress software from directly accessing egress data structures). Network processor 200 is designed to function collectively as a single network processor though many discrete functional units may implement the processor, with the discrete units communicated to each other. Network processor 200 includes discrete processing resources on ingress side 205 and on egress side 210, with an internal communication channel from egress side 210 to ingress side 205 identified as wrap 215. Both ingress side 205 and egress side 210 have separate physical memories 220, control stores 225, a network processing unit 230, among other processing resources.

While there are many advantages to designing network processor 200 in this way, it requires a different creation/initialization method from the control point method described with respect to network processor 100.

Since the ingress and egress memories/processing engines are physically separated in network processor 200, in order to create/initialize data structures on a particular side of network processor 200, a control point must direct appropriate control plane messages explicitly to that particular side. Control plane software executing on network processor 200 is perfectly able to efficiently create and initialize the desired data structures on the appropriate side.

Network Processor Management Software executing on the control point decides on location, structure, size and properties of the Network Processor data structures such as, for example, forwarding tables. A control point operating in a homogenous network having either type of network processor described above can readily send appropriate control plane messages to create and initialize both ingress and egress data structures. In a heterogeneous, or mixed, configuration of network processors, the network processor management software has to be sensitive to the fact that any particular network processor may have one of two or more different architectures.

Accordingly, what is needed is a method and system for providing network processor management that efficiently operates in homogenous and heterogonous environments. The present invention addresses such a need.

SUMMARY OF THE INVENTION

A method and system is disclosed for network processor management that efficiently operates in homogenous and heterogonous environments. The system includes a controlled entity having a switched architecture including a first set of processing resources and a second set of processing resources distinct from the second set of processing resources; a controller for issuing a control request packet to the first set of processing resources, the control request packet including a first set of control actions and a second set of control actions wherein the controlled entity processes the first set of control actions using the first set of processing resources and transfers the second set of control actions to the second set of processing resources. The method for communicating between a controller and one or more controlled entities, each controlled entity having a first set of processing resources and a second set of processing resources, the method includes transmitting a control packet from the controller to the first set of processing resources of each of the controlled entities, the control packet including a first set of control actions and second set of control actions; processing the first set of control actions using the first set of processing resources and communicating the second set of control actions to the second set of processing resources for those controlled entities of a first type responsive to two sets of control actions; and processing both the first set of control actions and the second set of control actions using the first set of processing resources for those controlled entities of a second type sharing at least some processing resources between the first set of processing resources and the second set of processing resources.

The present invention permits uniform network processor management that efficiently operates in homogenous and heterogonous environments.

DETAILED DESCRIPTION

Figure 1:
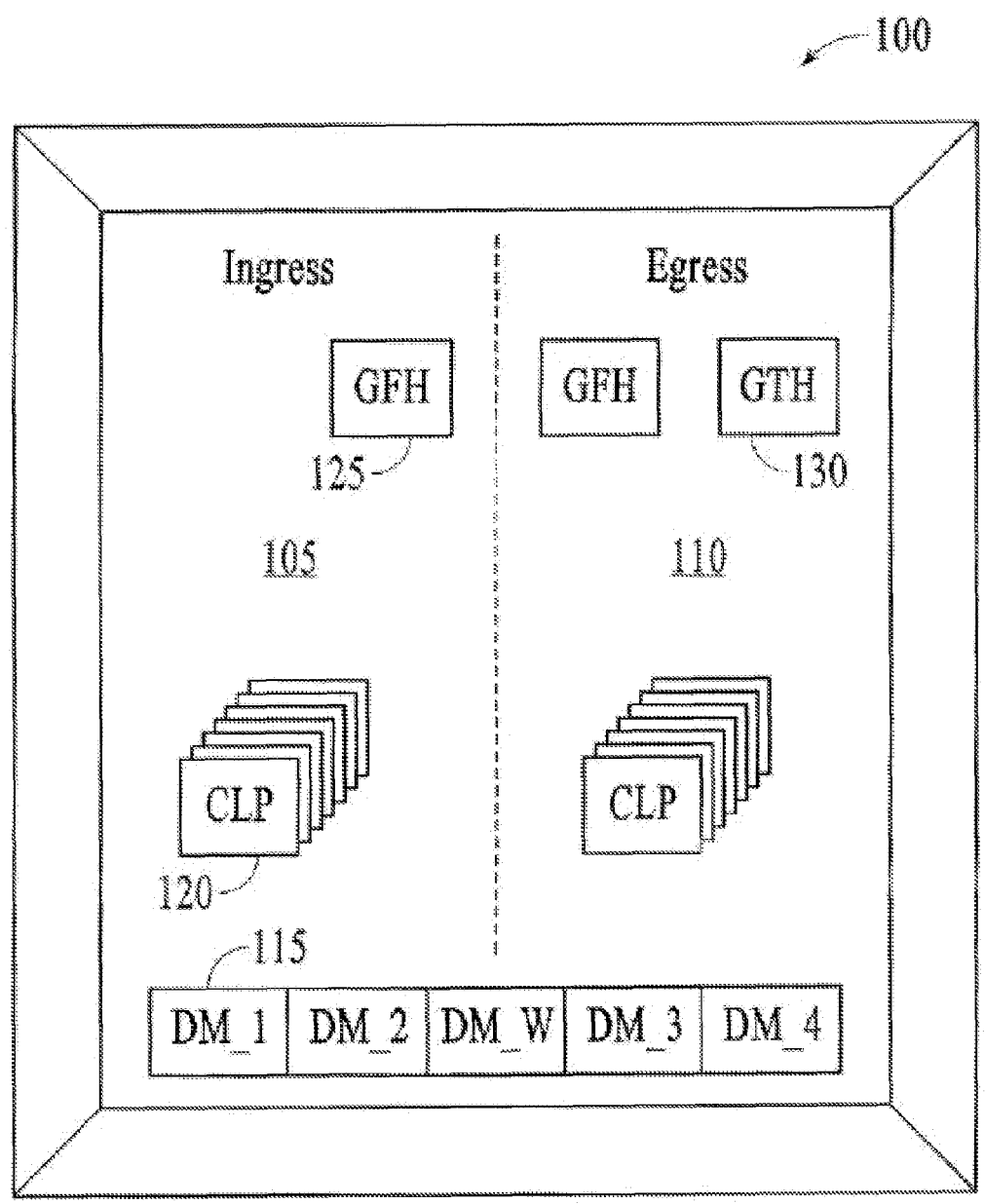
FIG. 1 is a schematic representation of a network processor having a switched architecture in which processing resources are shared between egress and ingress sides.
Figure 2:
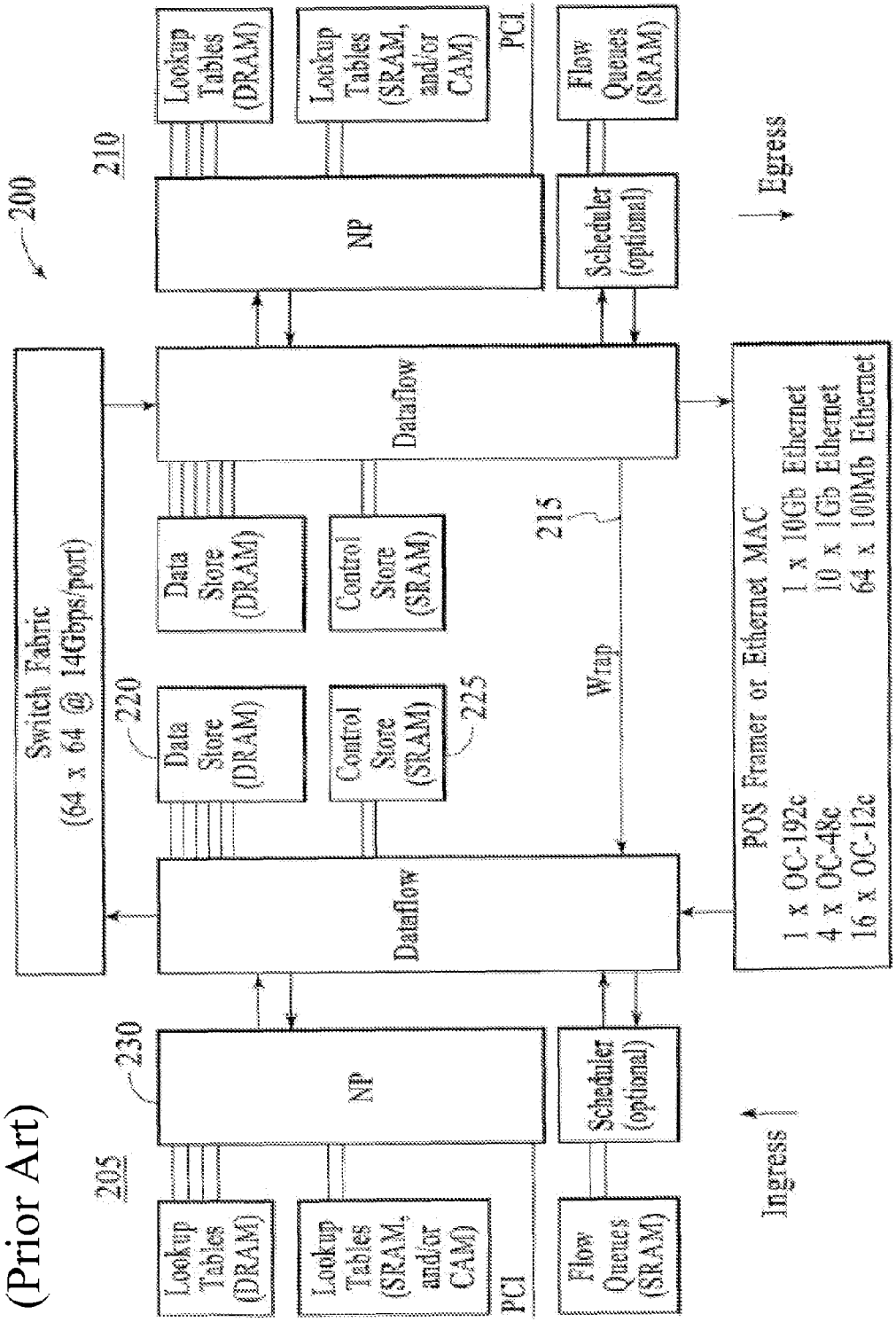
FIG. 2 is a schematic representation of a network processor having a switched architecture in which processing resources are split between an ingress side and an egress side.
Figures 3, 5:
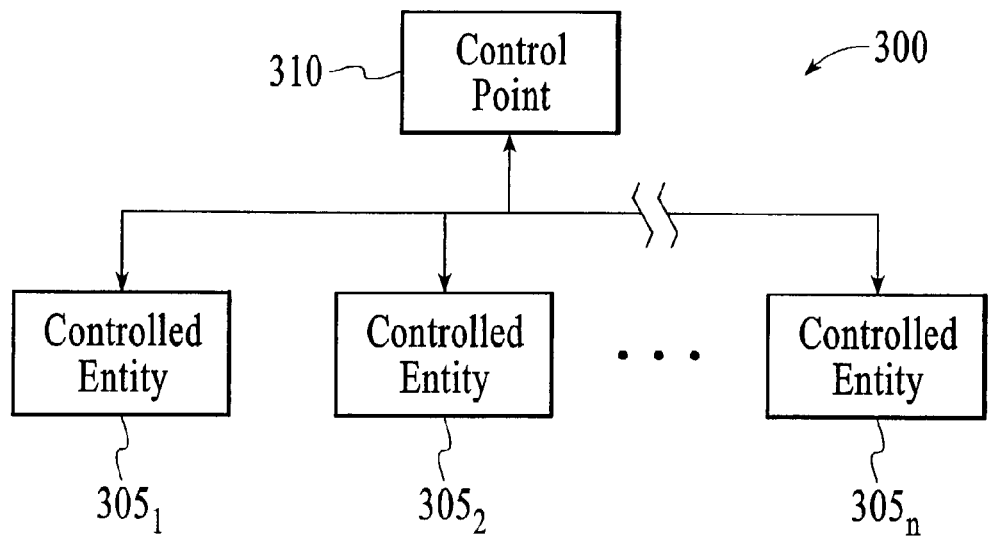
FIG. 3 is a schematic block diagram of a system having a plurality of network processors communicated to a control point.
FIG. 5 is a block diagram illustrating the format of a Guided Command.

FIG. 3 is a schematic block diagram of a system 300 having a plurality of network processors $305_n$ communicated to a control point 310. Each network processor $305_x$ has a switched architecture and may be either a network processor of the types represented in FIG. 1 and in FIG. 2. The preferred embodiment of the present invention relates to uniform management of a mixed system of network processors 305 from control point 310, wherein mixed system means at least one network processor as shown in FIG. 1 and in FIG. 2 included in system 300. In the preferred embodiment of the present invention, controlled entities 305 (e.g., network processors) are receptive to, and responsive to, a messaging architecture that exists between each of them and controlling entity 310 (e.g., one or more control points). Control request packets containing one or more control actions are directed to one (unicast) or more (multicast) controlled entities 305. Controlled entities 305 each have a switched architecture meaning that each has distinct processing resources and capabilities on an egress side and on an ingress side. The messaging architecture enables controlling entity 310 to direct a control packet to either the egress side or the ingress side of one or more controlled entities 305. Each controlled entity 305 possesses a requisite intelligence to parse a control packet, execute control actions and optionally send a control response back to an originator.

The preferred embodiment places one or more separators into a control packet, with each separator delineating one or more sets of control actions to be executed on one side from another one or more sets of control actions, with each set of control actions having from zero to a maximum size (determined by the messaging architecture) of control actions. Controlled entities 305 having distinct resources (e.g., physical separation between ingress data structures and egress data structures) respond to the separator by transferring subsequent control actions in the control packet following the separator to the opposite side. When multiple separators exist in one control packet, control actions may be cycled back and forth between the two sides multiple times until the control actions are all processed on the appropriate side. Controlled entities 305 having shared resources (e.g., logical separation between ingress data structures and egress data structures) ignore the separator at least in the sense that control actions following a separator are not transferred to an opposite side for processing.

In operation, a control packet including five egress actions and five ingress actions is multicast to a mixed network system 300 having a shared resource network processor $305_1$ and a split resource network processor $305_2$. The control packet is injected into the egress sides of both network processors 305 simultaneously.

Without using the present invention, all ten actions in the control packet would be executed successfully on network processor $305_1$ since ingress resources are accessible from the egress side. However, the five ingress actions in the control packet would fail on network processor $305_2$ because ingress resources are not accessible from the egress side.

By using the present invention, all ten actions are executed successfully on both network processor $305_1$ and network processor $305_2$. This is because a separator is inserted after the five egress actions (i.e., between action five and action six). Network processor $305_1$ ignores the separator and executes all ten actions as it did without the separator. Network processor $305_2$ however now transfers the ingress actions to the ingress side for processing upon locating the separator positioned after the fifth egress action. After transferring the ingress actions to the ingress side, network processor $305_2$ completes the execution of the ingress actions successfully because the ingress resources are now accessible.

Specifically, the transfer process results in a suspension of processing at the egress side when the separator is located. The partially processed control packet is transmitted to the ingress side of network processor $305_2$. Intelligence on the ingress side recognizes the partially processed control packet and skips the egress actions by scrolling through the executed egress action until an unprocessed separator is located. The ingress side skips over this first unprocessed separator and starts processing the actions until an end of packet indication or another separator is reached.

Figure 4:
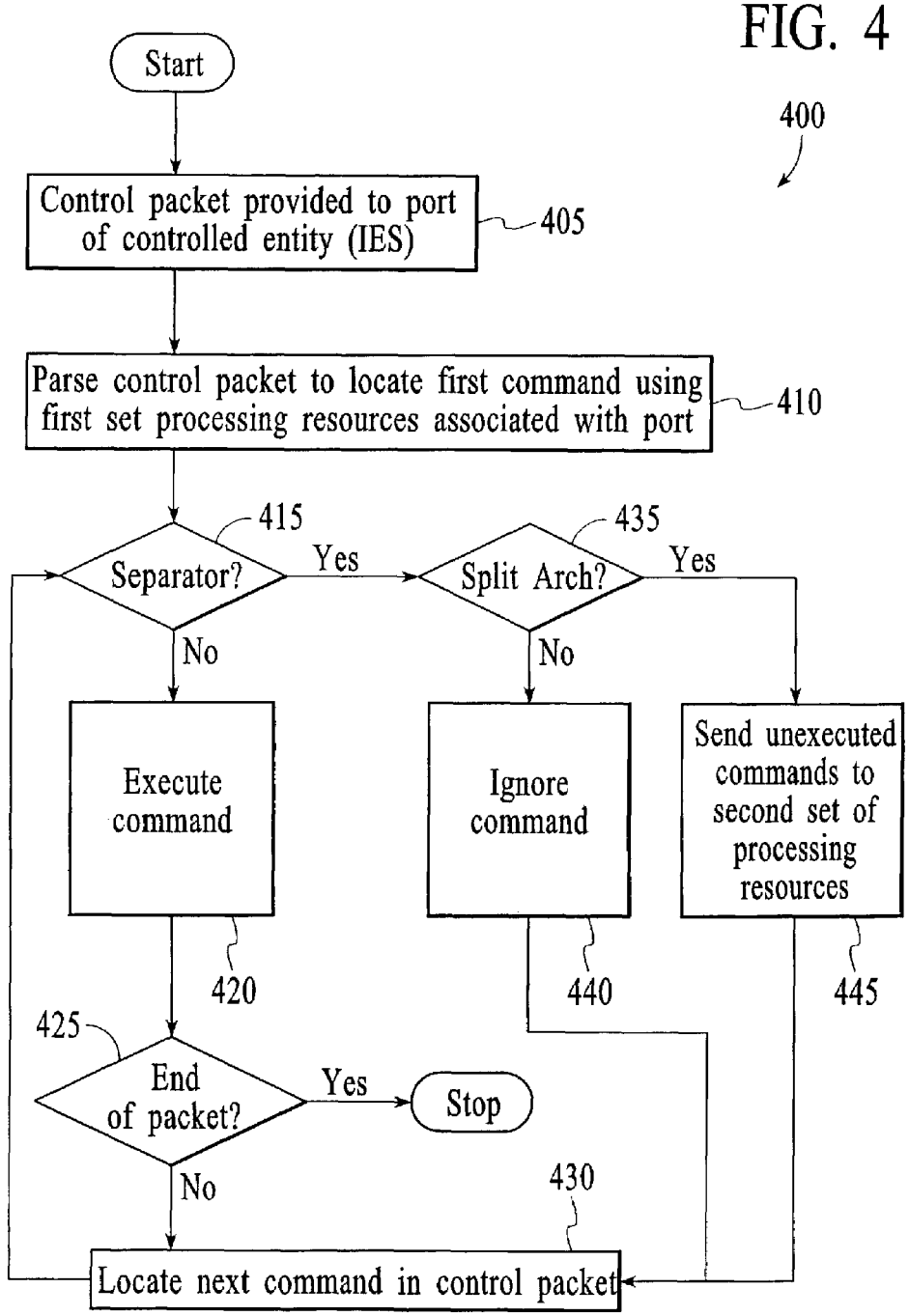
FIG. 4 is a flowchart for a preferred embodiment for a communication process.

FIG. 4 is a flowchart for a preferred embodiment for a communication process 400. Process 400 begins with step 405 with the arrival of a control packet at a particular port of a controlled entity 305 shown in FIG. 3. The port is either an ingress port or an egress port. Intelligence associated with the receiving port parses, at step 410, the control packet to locate a first control action.

Process 400 tests the located control action at step 415 to determine whether it is a separator. If it is not a separator, processing resources execute the control action at step 420. Next, process 400 tests at step 425 whether there is an end of packet indication. If there is, process 400 terminates.

However, if the test at step 425 is not an end of packet indication, process 400 advances to step 430 to locate a next control action within the control packet. After locating the next control action, process 400 returns to step 415 to test whether the control action is a separator.

As long as the current control action is not a separator, process 400 advances to step 420 to execute the control action and tests again for an end of packet indication at step 425. Steps 415-430 continue until a separator is found or end of packet is indicated.

When test 415 finds a separator, process 400 advances to step 435 to determine what to do with the separator. For network processor having shared resources (i.e., it is not a split resources architecture), process 400 determines at test 435 that the processing resources of the current side can safely ignore the command at step 440 and thereafter returns to step 430 to locate a next control action.

When a separator is found at step 415 and the test at step 435 determines that the processor is a split architecture and not a shared architecture, process 400 advances to step 445 after test 435. Step 445 is a transfer step that sends unexecuted control actions to the other side of the network processor. After step 445, process 400 returns to step 430 to locate a next control action in the control packet following the separator. Process 400 then continues to process control actions by executing step 415 through step 445 until an end of packet indication is detected, upon which time process 400 terminates. It is possible for the control packet to transfer several times between the ingress and egress sides if necessary by embedding multiple separators in the control packet.

A preferred embodiment of the present invention uses an IBM PowerNP SWITCHOVER Guided Command as the separator. FIG. 5 is a block diagram illustrating the format of a SWITCHOVER Guided Command 500. Guided Command 500 has a length of three words, the first word being the command header and the other two words reserved for future use. Within the command header, there are four fields in the following order: a sixteen bit length field 505, an eight bit completion field 510, a two bit mode field 515, and a six bit command field 520. The exact value that command field 520 assumes is defined during implementation.

Mode field 515 has a special purpose and is initially set to zero. During processing, mode field 515 caries state information from one side to the other to assist the most recent side in locking on the appropriate SWITCHOVER command (i.e., the appropriate separator). Table I includes the values that mode field 515 assumes over the life cycle of any given guided command.

TABLE I

Mode Field 515

| Value | Description |
| --- | --- |
| 00 | Not Signaled |
| 01 | Signaled |
| 10 | Processed |
| 11 | Reserved |

The value of mode field 515 changes from the initial "Not Signaled" 00 state to the "Signaled" 01 state when the Guided Command is encountered for the first time on a particular side. When the Guided Command reaches the other side, an indication in a Frame Header indicates to a frame processor that the Guided Command is a 'partially processed' frame (because an Ingress/Egress bit in the header is toggled before dispatching the guided command to the opposite side). On detecting this 'partially processed condition' for the guided frame, the frame processor on the receiving side scrolls through the guided command looking for a SWITCHOVER Guided Command having a "Signaled" state. Upon locating this SWITCHOVER Guided Command, the frame processor changes mode field 515 of the Signaled SWITCHOVER Guided Command to the "Processed" state and resumes regular guided command processing beginning with the Guided Command following the SWITCHOVER Guided Command.

In operation, to use the modified Guided Command with both the NP4GS3 and network processor 200 shown in FIG. 2, the control software of the NP4GS3 is upgraded to recognize the SWITCHOVER Guided Command but not to take any action other than to step-over it and process the next in sequence command. In network processor 200, the control software does process the SWITCHOVER Guided Command.

The control software of the network processor 200 recognizes the SWITCHOVER command and suspends processing of further control actions in the control packet. The control software dispatches the control packet to the opposite side for further processing. When the control packet reaches the other side, control software on the current side commences processing of the control packet with the Guided Command immediately following the SWITCHOVER Guided Command that initiated the transfer. Processing continues until (a) an END_DELIMETER Guided Command is encountered, or (b) an error is encountered while processing a Guided Command and an IND/CHND bit in the packet header is set to '0' (i.e., CHAINED), or (c) another SWITCHOVER Guided Command is encountered.

The END_DELIMETER Guided Command ends processing and the control packet (i.e, the guided frame) is either discarded or converted into a response and returned back to an originating controlling entity. Encountering an error when processing a Guided Command while CHAINED command processing is indicated is treated just like encountering the END_DELIMTER Guided Command.

The SWITCHOVER Guided Command causes a suspension of processing and a subsequent frame dispatch to the opposite side. Then processing resumes with the Guided Command following the SWITCHOVER command.

In this preferred embodiment, the frame dispatch triggered by the SWITCHOVER command is subject to the same queing/dispatch conditions as other frames entering the particular side of the network processor. This means that there is no guarantee that the Guided Command following a SWITCHOVER command will be processed immediately after the Guided Command preceding the SWITCHOVER command. Additionally, in some cases a network processor may support Command Groups or Nested Command Groups. When supported, these Command Groups cannot include SWITCHOVER Guided Commands. In other embodiments, it may be possible to provide for execution priority for transferred guided frames and for implementing SWITCHOVER commands in Command Group-like implementations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
   a controlled entity having a switched architecture including a first set of processing resources and a second set of processing resources distinct from the first set of processing resources; and
   a controller for issuing a control request packet to the first set of processing resources, the control request packet including a first set of control actions and a second set of control actions wherein the controlled entity processes the first set of control actions using the first set of processing resources and transfers the second set of control actions to the second set of processing resources, wherein a separator identifies a delineation between the first set of control actions and the second set of control actions.

2. The system of claim 1, wherein each control action of the first set of control actions is flagged as being in the first set of control actions and each control action of the second set of control actions is flagged as being in the second set of control actions.

3. The system of claim 1, wherein the control request packet includes a third set of control actions and wherein the controlled entity processes the third set of control actions using the first set of processing resources after the first set of control actions and the second set of control actions have been processed.

4. The system of claim 1 wherein the control request packet identifies a processing sequence for the control actions and wherein a processing of a first control action of the second set of control actions is initiated after a processing of a last control action of the first set of control actions is initiated.

5. The system of claim 4 wherein the control request packet includes a third set of control actions and wherein the controlled entity processes a first control action of the third set of control actions using the first set of processing resources after a processing of a last control action of the second set of control actions is initiated.

6. A system, comprising:
    a first controlled entity having a switched architecture including a first set of processing resources and a second set of processing resources distinct from the first set of processing resources;
    a second controlled entity having an architecture including a first set of processing resources and a second set of processing resources sharing at least a part of the first set of processing resources; and
    a controller for issuing a control request packet to the first set of processing resources of each of the controlled entities, the control request packet including a delineation between a first set of control actions from a second set of control actions wherein the first controlled entity processes the first set of control actions using the first set of processing resources and transfers the second set of control actions to the second set of processing resources and wherein the second controlled entity processes both the first set and the second set of control actions using the first set of processing resources.

7. The system of claim 6, wherein a separator identifies the delineation between the first set of control actions and the second set of control actions.

8. The system of claim 6, wherein each control action of the first set of control actions is flagged as being in the first set of control actions and each control action of the second set of control actions is flagged as being in the second set of control actions.

9. The system of claim 6, wherein the control request packet includes a third set of control actions and wherein the first controlled entity processes the third set of control actions using the first set of processing resources after the first set of control actions and the second set of control actions have been processed.

10. The system of claim 6, wherein the control request packet identifies a processing sequence for the control actions and wherein a processing of a first control action of the second set of control actions is initiated after a processing of a last control action of the first set of control actions is initiated.

11. The system of claim 10, wherein the control request packet includes a third set of control actions and wherein the first controlled entity processes a first control action of the third set of control actions using the first set of processing resources after a processing of a last control action of the second set of control actions is initiated.

12. A switched architecture controllable entity, comprising:
    a first set of processing resources;
    a second set of processing resources distinct from the first set of processing resources; and
    a control, responsive to a control request packet having a first set of control actions and a second set of control actions both directed to the first set of processing resources, for communicating the second set of control actions to the second set of processing resources, wherein the control packet includes a separator between the first set of control actions and the second set of control actions wherein the control communicates the second set of control actions upon encountering the separator in the control packet.

13. The switched architecture controllable entity of claim 12, wherein each control action of the first set of control actions is flagged as being in the first set of control actions and each control action of the second set of control actions is flagged as being in the second set of control actions.

14. A method for communicating between a controller and one or more controlled entities, each controlled entity having a first set of processing resources and a second set of processing resources, comprising the steps of:
    transmitting a control packet from the controller to the first set of processing resources of each of the controlled entities, the control packet including a first set of control actions and a second set of control actions;
    processing the first set of control actions using the first set of processing resources and communicating the second set of control actions to the second set of processing resources for those controlled entities of a first type responsive to two sets of control actions; and
    processing both the first set of control actions and the second set of control actions using the first set of processing resources for those controlled entities of a second type sharing at least some processing resources between the first set of processing resources and the second set of processing resources.

15. A method for communicating between a controller and one or more controlled entities, each controlled entity having a first set of processing resources and a second set of processing resources, comprising the steps of:
    receiving a control packet at the first set of processing resources of each of the controlled entities, the control packet including a first set of control actions and a second set of control actions;
    processing the first set of control actions using the first set of processing resources and communicating the second set of control actions to the second set of processing resources for those controlled entities of a first type responsive to two sets of control actions; and
    processing both the first set of control actions and the second set of control actions using the first set of processing resources for those controlled entities of a second type sharing at least some processing resources between the first set of processing resources and the second set of processing resources.

* * * * *